(12) United States Patent
Ichino

(10) Patent No.: US 6,822,810 B2
(45) Date of Patent: Nov. 23, 2004

(54) LENS APPARATUS AND IMAGE-TAKING APPARATUS

(75) Inventor: Kazushige Ichino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/784,847

(22) Filed: Feb. 23, 2004

(65) Prior Publication Data

US 2004/0165280 A1 Aug. 26, 2004

(30) Foreign Application Priority Data

Feb. 26, 2003 (JP) ........................................ 048806/2003

(51) Int. Cl.⁷ .............................................. G02B 15/14
(52) U.S. Cl. ...................... 359/696; 359/697; 359/698; 359/699; 359/700; 359/701; 359/704; 359/819; 359/822; 359/823; 359/826; 359/829
(58) Field of Search ................................ 359/696–701, 359/704, 819, 822–823, 826, 829–830

(56) References Cited

U.S. PATENT DOCUMENTS

| | | | | |
|---|---|---|---|---|
| 4,154,510 A | * | 5/1979 | Katagiri | ...................... 359/826 |
| 6,115,197 A | * | 9/2000 | Funahashi | ................... 359/826 |
| 6,369,962 B1 | * | 4/2002 | Nomura et al. | ............. 359/822 |
| 6,392,828 B1 | * | 5/2002 | Nomura et al. | ............. 359/827 |
| 6,522,478 B2 | * | 2/2003 | Nomura et al. | ............. 359/694 |
| 6,522,482 B2 | * | 2/2003 | Nomura et al. | ............. 359/701 |
| 6,751,032 B2 | * | 6/2004 | Nomura et al. | ............. 359/819 |
| 2001/0026401 A1 | * | 10/2001 | Koiwai et al. | ............. 359/699 |
| 2002/0135887 A1 | * | 9/2002 | Nomura et al. | ............. 359/699 |
| 2002/0135898 A1 | * | 9/2002 | Nomura et al. | ............. 359/819 |
| 2003/0117725 A1 | * | 6/2003 | Nomura et al. | ............. 359/819 |

FOREIGN PATENT DOCUMENTS

JP    H07(1995)-043584    2/1995

* cited by examiner

*Primary Examiner*—Evelyn A. Lester
(74) *Attorney, Agent, or Firm*—Cowan, Liebowitz & Latman

(57) ABSTRACT

A lens apparatus which is easy to assemble, provides high strength at the flange portion, and achieves high degree of design freedom, too, is disclosed. On the circumferential wall of a second barrel member, a first groove portion is disposed to guide a guide portion provided in the first barrel member and at the end of optical axis direction of the circumferential wall, a flange portion is formed. On a third barrel member, a cam portion which engages with a cam follower portion provided on the guide portion is formed.

5 Claims, 6 Drawing Sheets

LENS APPARATUS AND IMAGE-TAKING APPARATUS

BACKGROUND OF THE INVENTION

1. Field of the Invention

The present invention relates to a barrel mounted to image-taking apparatus such as silver halide camera and digital still cameras, and more specifically video cameras, etc.

2. Description of the Related Art

FIG. 6 shows a barrel of a conventional camera (see Japanese Patent Application Laid-Open Publication No. H07(1995)-043584). In the figure, numeral 101 denotes a rectilinear barrel, and this rectilinear barrel 101 is positioned inside a differential barrel not illustrated. When this differential barrel moves in the optical axis direction while the differential barrel rotates around the optical axis, the rectilinear barrel 101 moves in the optical axis direction in linkage with the movement of the differential barrel while the rectilinear barrel 101 does not rotate around the optical axis.

To the rectilinear barrel 101, three guide groove portions 101d extending along the optical axis direction are located at nearly even intervals. To guide the groove portion 101d, a cam pin (not illustrated) mounted to a lens holding member to be assembled inside the rectilinear barrel 101 is engaged.

At the rear end portion of the rectilinear barrel 101, a flange portion 101a that extends along the circumferential direction of the rectilinear barrel 101 is positioned. At the position of the phase same as that of the guide groove portion 101d of the flange portion 101a, an opening 101c for passing the cam pin is provided. When a lens holding member is assembled to the rectilinear barrel 101, the cam pin can be guided to guide the groove portion 101d in such a manner as to pass the opening portion 101c from the rear side of the rectilinear barrel 101.

In addition, to the flange portion 101a, a protruded portion 101b is positioned at the location of the phase same as that of the opening portion 101c. This protruded portion 101b prevents the rectilinear barrel 101 from rotating around the optical-axis by engaging with a rectilinear groove portion formed in a fixed barrel (either not illustrated).

As described above, in the conventional lens barrel, the opening portion 101c and the protruded portion 101b are arranged at the position of the same phase. This is because strength is weakened at the place where the opening portion 101c of the flange portion 101a is formed because the size in the height direction of the flange portion is shortened. That is, the protruded portion 101b is arranged at the position of the phase same as that of the opening portion 101 and the strength of the flange portion 101a is prevented from being degraded.

However, if it is mandatory to arrange the protruded portion 101b at the position of the phase same as that of opening portion 101c, the degree of design freedom is impaired. That is, the protruded portion 101b must be arranged in such a manner as to engage with the rectilinear groove portion formed in the fixed barrel. Consequently, the opening portion 101c, the guide groove portion 101d, the protruded portion 101b, and the rectilinear groove portion of the fixed barrel must be arranged at the position of the same phase. This may impair the degree of design freedom.

SUMMARY OF THE INVENTION

It is an object of the present invention to provide a lens apparatus which is easy to assemble and at the same time which achieves a high degree of design freedom while securing sufficient strength at the flange portion.

The lens apparatus which is one aspect of the present invention comprises a first, a second, and a third barrel members. The first barrel member comprises a guide portion which is guided in an optical axis direction and a cam follower portion provided on the guide portion. The second barrel member has a first groove portion which guides the guide portion formed on the circumferential wall in the optical axis direction, and at the optical axis direction end of the circumferential wall, a flange portion is formed. In the third barrel member, there formed is a cam portion which engages with the cam follower portion and drives the first barrel member in the optical axis direction. In addition, the lens apparatus has a drive mechanism which rotates and drives the third barrel member around the optical axis.

And on the periphery of the flange portion, a concave portion which evacuates to the drive mechanism is formed, and in the inner circumference of the flange portion, an opening portion is formed for allowing the cam follower portion to pass when the guide portion is engaged with the first groove portion. Furthermore, in the second barrel member, the first groove portion and the opening portion are formed in different positions in the circumferential direction and at the same time, on the circumferential wall, the second groove portion is formed to assemble the guide portion into the first groove portion from the position of the opening portion.

The features of the lens apparatus and image-taking apparatus according to the present invention will become more apparent from the following description taken in connection with the accompanying drawings.

DETAILS DESCRIPTION OF THE PREFERRED EMBODIMENTS

Referring now to drawings, embodiments of the present invention will be described in detail as follows.

Figure 5:
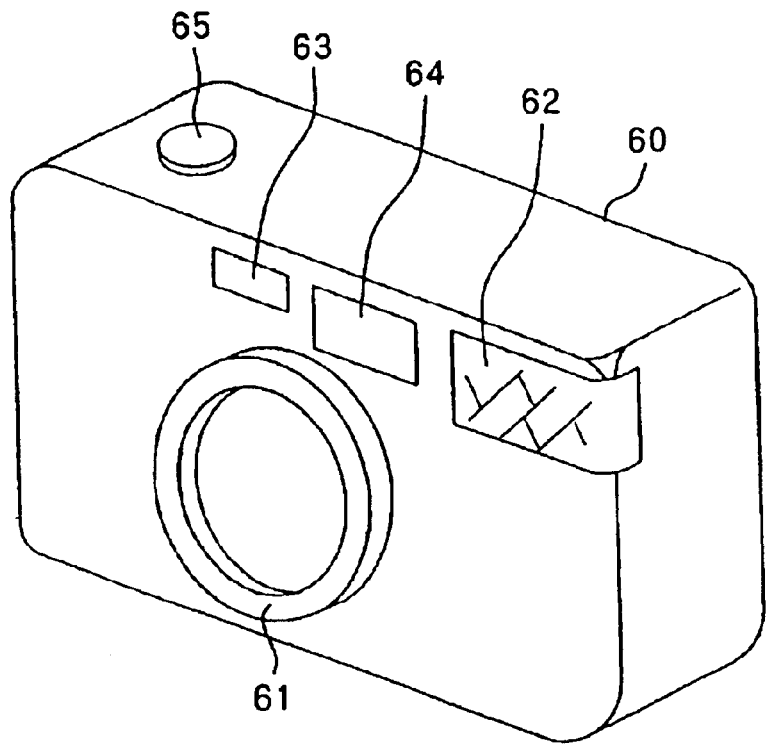
FIG. 5 is an external view of a camera to which the lens barrel of the present embodiment is mounted.

First of all, FIG. 5 is an external view of a camera equipped with a lens barrel according to the present embodiment. In FIG. 5, numeral 60 denotes a camera body, and at the front center of this camera body 60, a lens barrel 61 which can zoom is placed.

Figure 1:
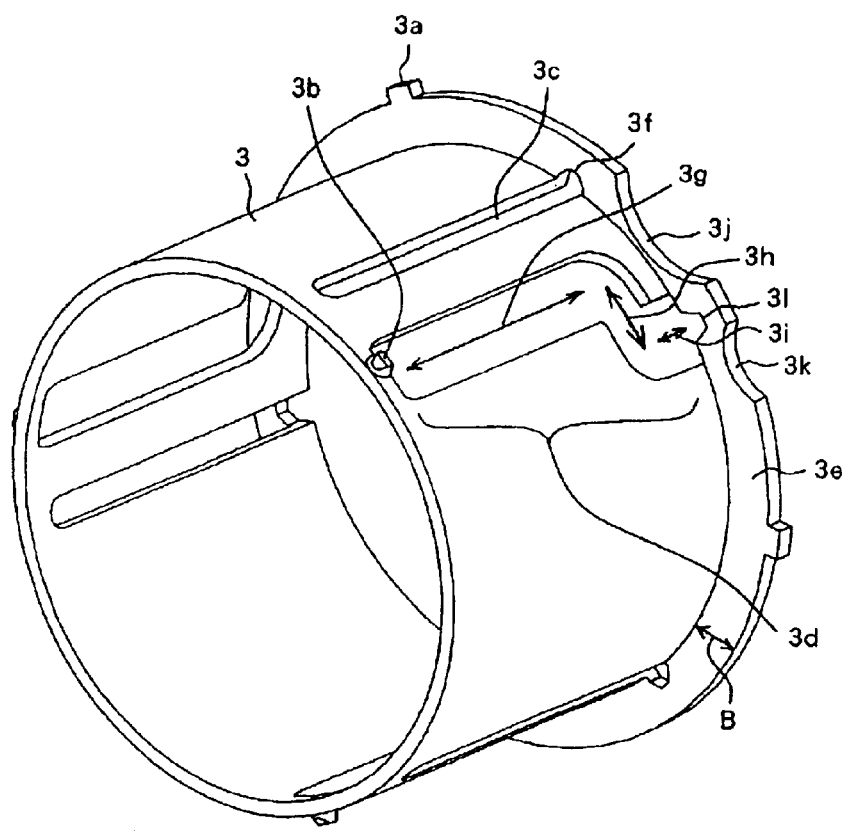
FIG. 1 is a perspective view of the rectilinear barrel comprising the lens barrel of the present embodiment.
Figure 2:
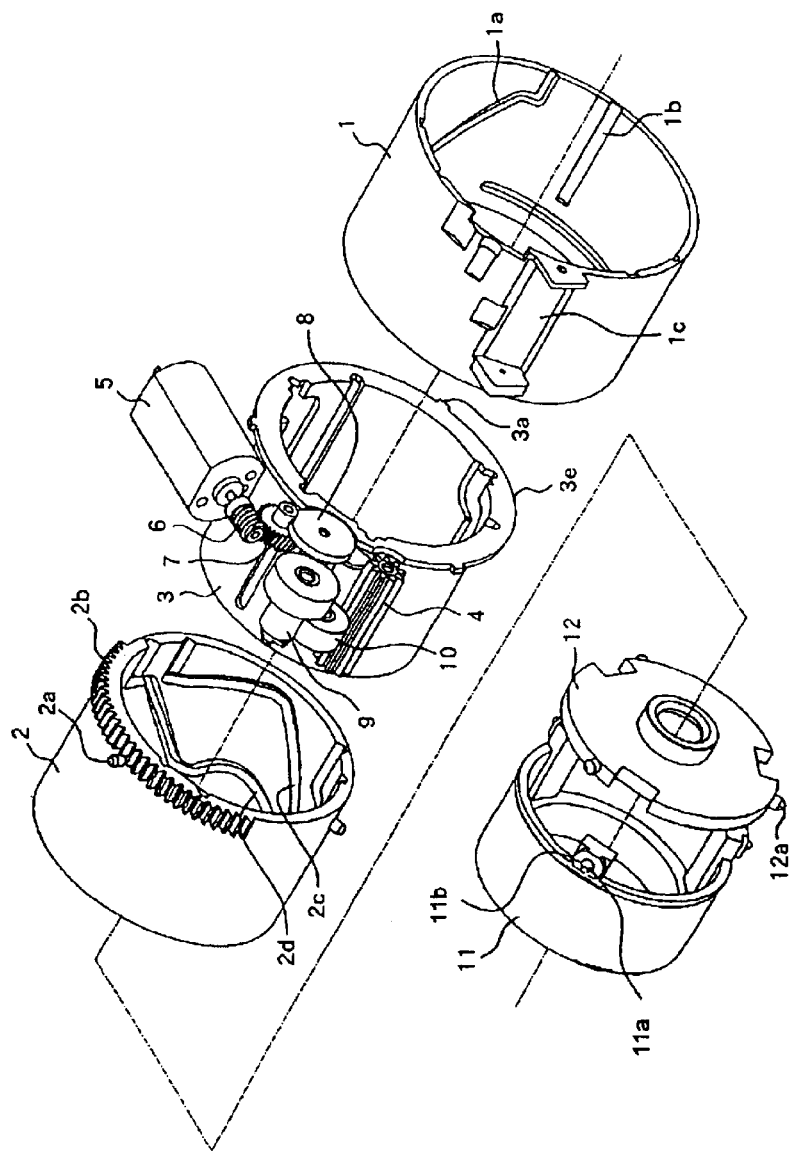
FIG. 2 is an exploded view in perspective of the lens barrel of the present embodiment.
Figure 3:
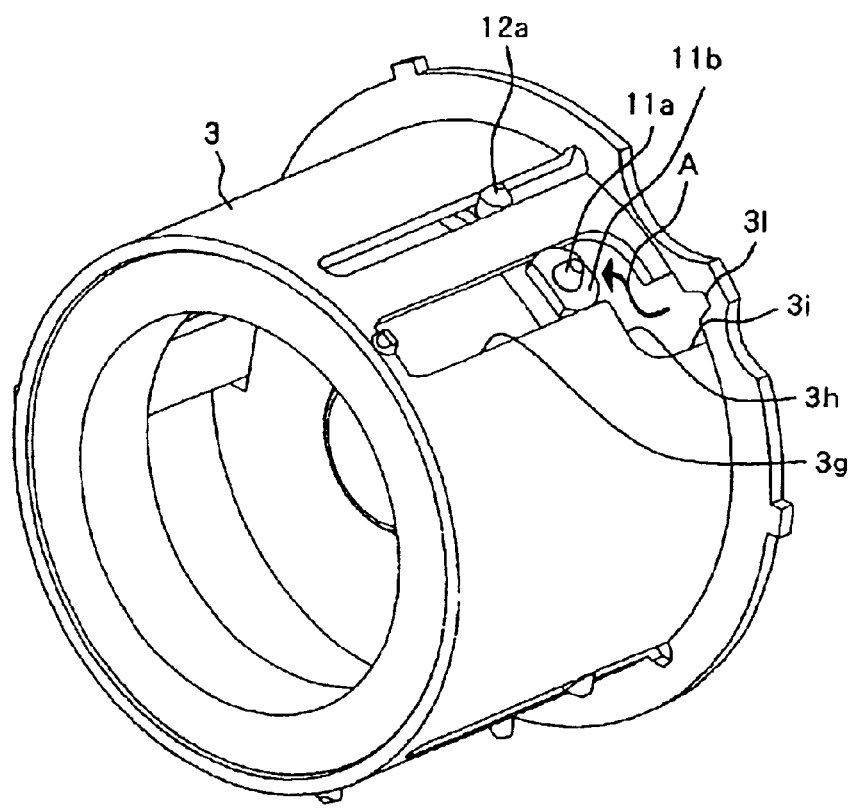
FIG. 3 is a perspective view of the rectilinear barrel of the present embodiment.
Figure 4:
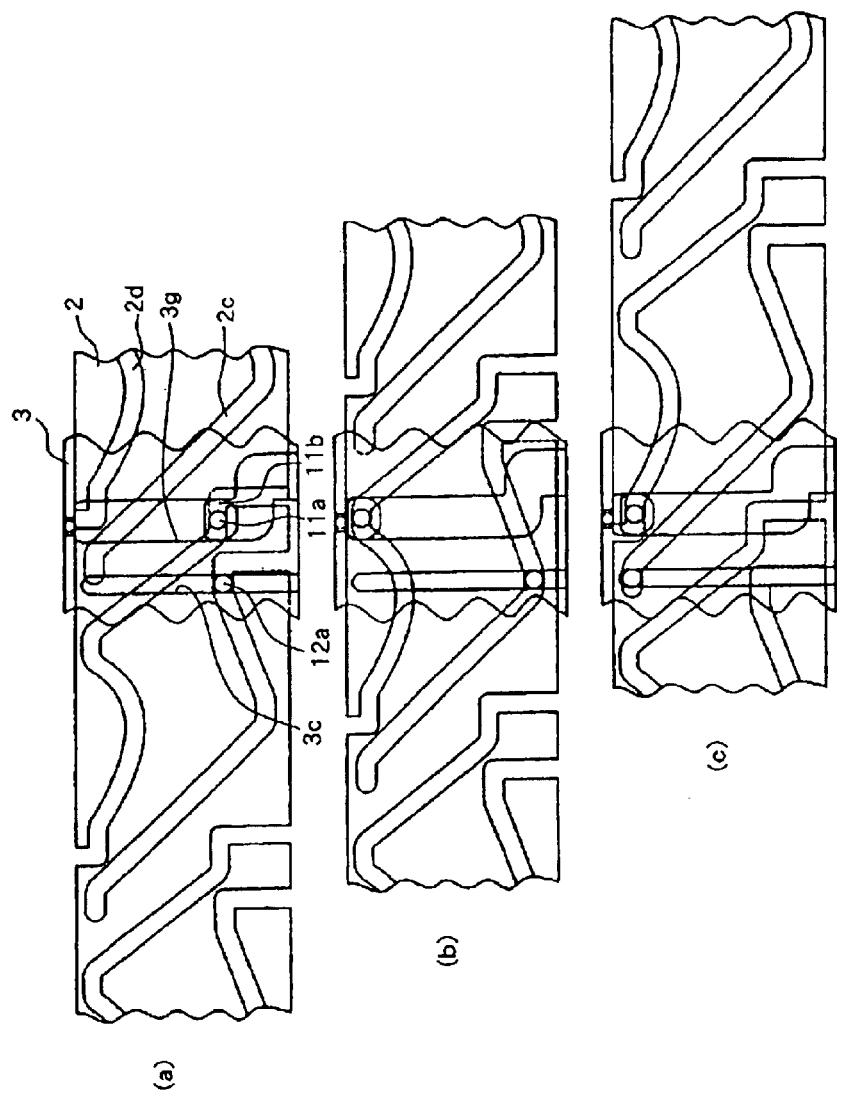
FIG. 4 illustrates the manner how the first lens unit barrel moves.

Next discussion is made on an embodiment of the present invention using FIG. 1 through FIG. 4. Now, FIG. 1 is a perspective view of a rectilinear barrel comprising the lens barrel of the present embodiment, and FIG. 2 is an exploded view in perspective of the lens barrel. FIG. 3 is a perspective view of the rectilinear barrel with the first lens unit barrel and the second lens unit barrel are assembled, and FIG. 4 illustrates the manner how the first lens unit barrel moves.

On the right side in the front surface of the camera body 60, a light-emitting window portion 62 that composes a stroboscope which irradiates the subject with an illumination light is positioned and on the left side of the light-emitting window portion 62, a finder window section 64 and a photometric window section 63 are positioned, respectively.

Furthermore, on the top of the camera body 60, a release button 65 for starting image-taking preparation action (focus detecting action and photometric action) and image-taking action (light exposure to image pickup devices such as film, CCD, CMOS sensor, etc.) is positioned.

Referring now to FIG. 2, the configuration of the entire lens barrel will be described. Numeral 1 denotes a fixed barrel (fourth lens barrel member), and on the inner circumferential surface of this fixed barrel 1, a cam groove portion 1a and a rectilinear groove portion 1b which extends along the optical axis direction are formed.

The cam groove portion 1a engages with a cam pin 2a positioned on the outer circumferential surface of a cam barrel 2 (third lens barrel member) and the rectilinear groove portion 1b engages with a protruded portion 3a formed at a flange portion 3e disposed at a rectilinear barrel later discussed.

At the rear end of the outer circumferential surface of the cam barrel 2, a gear 2b which extends in the circumferential direction of the cam barrel 2 is disposed. The gear 2b engages with a driving gear 4 via a gear opening portion 1c formed on the fixed barrel 1.

Numerals 6 through 10 denote reduction gears and decelerate outputs of a motor 5. The driving force of the motor 5 is transmitted from the pinion gear (worm gear) 6, to the second gear 7, to the third gear 8, to the fourth gear 9, to the fifth gear 10, and then to the driving gear 4 in that order.

Numeral 3 denotes a rectilinear barrel (second lens barrel member) and at the front end of the outer circumferential surface of this rectilinear barrel 3, a locking protrusion 3b (see FIG. 1) is disposed, and is integral with the cam barrel 2 in the contra-rotatable condition. At the rear end of the outer circumferential surface of the rectilinear barrel 3, the flange portion 3e which extends in the circumferential direction of the rectilinear barrel 3 is formed.

Numeral 11 denotes a first lens unit barrel (first lens barrel member), numeral 12 denotes a second lens unit barrel, and these lens barrels 11, 12 are housed inside the rectilinear barrel 3 as shown in FIG. 3. Inside the first lens unit barrel 11 and the second lens unit barrel 12, image-taking lenses not illustrated, etc. are mounted.

In the first lens unit lens barrel 11, a cam pin supporting member 11b (guide portion) is formed, and on this cam pin supporting member 11b, a cam pin 11a (cam follower portion) is formed. The Cam pin supporting member 11b engages with a first lens unit groove portion 3d formed on the rectilinear barrel 3. The construction of a first lens unit groove portion 3d is shown in FIG. 1 but the detail will be described later. In the second lens unit barrel 12, a cam pin 12a is formed.

Figure 6:
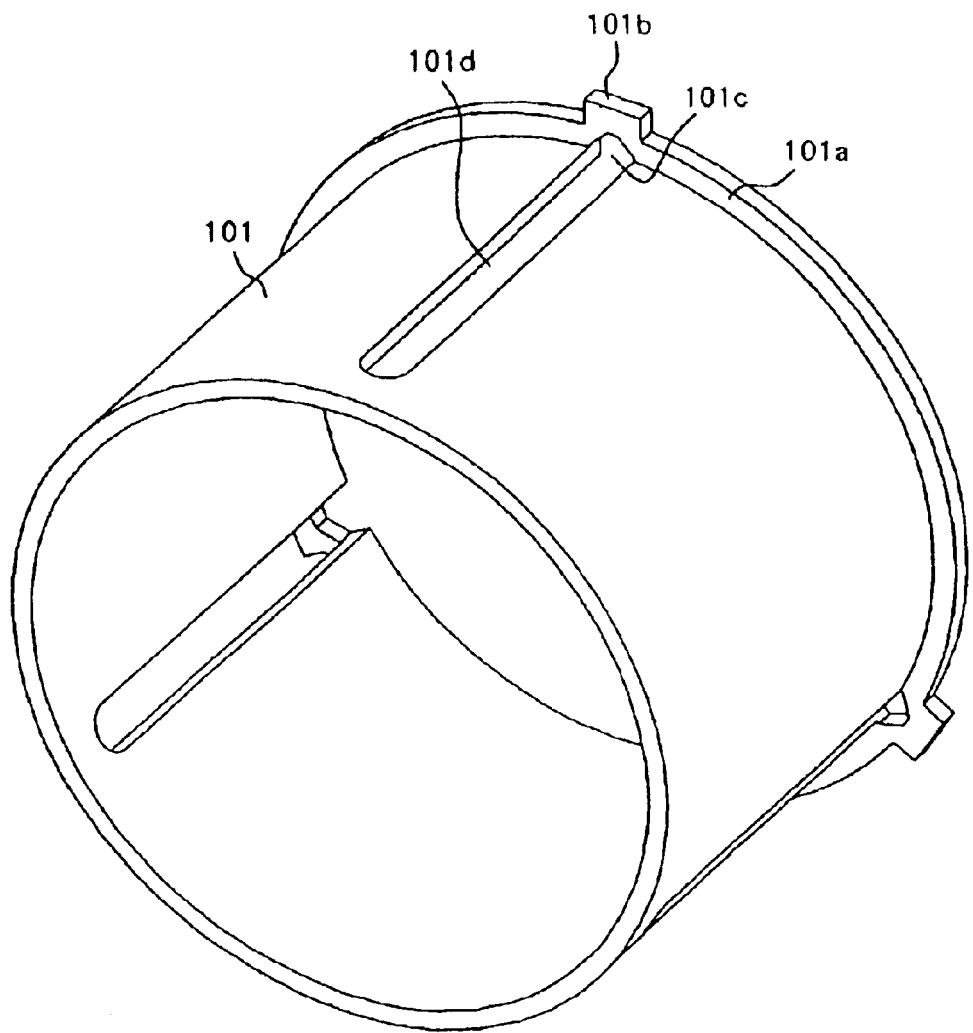
FIG. 6 is a perspective view of a conventional rectilinear barrel.

The height size (size of B shown in FIG. 1) of the flange portion 3e formed at the rear end of the outer circumferential surface of the above-mentioned rectilinear barrel 3 is set greater than a flange portion 101a of a conventional example shown in FIG. 6. Consequently, overlapping (interference) between the above-mentioned gears (third gear 8. and driving gear 4) positioned near the outer circumferential surface of the rectilinear barrel 3 and the flange portion 3e causes a problem.

In the present embodiment, this problem is solved by disposing a first outside diameter concave portion 3j to avoid overlapping with a third gear 8 and a second outside diameter concave portion 3k to avoid overlapping with the driving gear 4 at the flange portion 3e as shown in FIG. 1.

On the inner circumferential side of the flange portion 3e, an opening portion 31 is provided to allow the cam pin 11a disposed to the first lens unit barrel 11 to pass. The opening portion 31 is formed in such a manner that the phase is located between the first outside diameter concave portion 3j and the second outside diameter concave portion 3k.

Now, it can be thought that the opening portion 31 may be arranged at the position to achieve the same phase as that of the first outside diameter concave portion 3j or the second outside diameter concave portion 3k.

However, arranging the opening portion at the position of the same phase reduces the height size of the place where the opening portion 31 is formed in the flange portion 3e and decreases the strength of the flange portion 3e at the portion.

Therefore, in the present embodiment, the opening portion 31 in the circumferential direction is located between the first outside diameter concave portion 3j and the second outside diameter concave portion 3k.

Since in the portion in which the first outside diameter concave portion 3j and second outside diameter concave portion 3k are not formed, the height size B of the flange portion 3e is not reduced, even if the opening portion 31 is provided, it does not cause any problem to strength of the flange portion 3e.

In the flange portion 3e, the protruded portion 3a which engages the rectilinear groove portion 1b of the fixed barrel 1 is provided at three places in the circumferential direction as described above.

Now, as described above, the length of the height size B in the flange portion 3e is set longer than that in the conventional example. Consequently, it is no longer necessary to arrange the protruded portion 3a at the position of the phase same as that of opening portions 3f, 31 (3f will be described later) from the viewpoint of securing strength of the flange portion 3e.

As a result, the degree of positional freedom is increased from the conventional example on the flange portion 3e of the protruded portion 3a.

The cam pin 12a of the second lens unit barrel 12 engages with the second rectilinear groove portion 3c of the rectilinear barrel 3 shown in FIG. 1 and with the second cam groove portion 2c formed on the inner circumferential surface of the cam barrel 2. When the cam barrel 2 rotates around the optical axis, the second lens unit barrel 12 moves along the trajectory of the second cam groove portion 2c.

At the rear end of the second rectilinear groove portion 3c, the inner opening portion 3f formed by notching part of the inner circumference side of the flange portion 3e is disposed.

When the second lens unit barrel 12 is assembled into the rectilinear barrel 3, the cam pin 12a should be guided to the second rectilinear groove portion 3c in such a manner as to pass the opening portion 3f from the rear of the rectilinear barrel 3 (see FIG. 3).

The first lens unit groove portion 3d formed in the rectilinear barrel 3 comprises a first assembled groove portion 3i (second groove portion) connected to the opening portion 31, a second assembled groove portion 3h (second groove portion) connected to the first assembled groove portion 3i, and a first rectilinear groove portion 3g (first groove portion) connected to the second assembled groove portion 3h.

The first assembled groove portion 3i is formed in such a manner as to extend from the portion of the phase same as that of the opening portion 31 of the rectilinear barrel 3 to the optical axis direction, and the second assembled groove portion 3h is formed in such a manner as to extend in the circumferential direction of the rectilinear barrel 3, one end of which is connected to the first assembled groove portion 3i. In addition, the first rectilinear groove portion 3g extends in the optical axis direction, with its rear end connected to the other end of the second assembled groove portion 3h.

Furthermore, at the position where the first rectilinear groove portion 3g is extended in the flange portion 3e, the first outside diameter concave portion 3j is formed.

The first rectilinear groove portion 3g engages with the cam pin supporting member 11b and prevents the first lens unit barrel 11 from rotating around the optical axis when the first lens unit barrel 11 moves along the cam trajectory of the first lens unit cam groove portion 2d formed in the cam barrel 2.

The first lens unit barrel 11 is assembled inside the rectilinear barrel 3 from the rear of the rectilinear barrel 3. Specifically, assembly is completed by moving and rotating the first lens unit barrel 11 so that the cam pin supporting member 11b is moved in order of the opening portion 31, the first assembled groove portion 3i, the second assembled groove portion 3h, and the first rectilinear groove portion 3g (see FIG. 3).

FIG. 4 shows the manner how the assembled first lens unit barrel 11 moves along the first rectilinear groove portion 3g. Now, FIG. 4a illustrates the collapsed condition, FIG. 4b the wide-angle condition, and FIG. 4c the telephotographic condition.

As shown in FIG. 4, the cam pin 12a of the second lens unit barrel 12 moves in nearly whole area of the second rectilinear groove portion 3c of the rectilinear barrel 3.

As against this, the cam pin supporting member 11b of the first lens unit barrel 11 uses the first rectilinear groove portion 3g only of the first lens unit groove portion 3d, and the first assembled groove portion 3i and the second assembled groove portion 3h are not used.

This is because the first assembled groove portion 3i and the second assembled groove portion 3h are disposed only to guide the cam pin supporting member 11b to the first rectilinear groove portion 3g.

Consequently, the first assembled groove portion 3i and the second assembled grooved portion 3h may be formed in any directions if connection to the opening portion 31 and the first rectilinear groove portion 3g can be achieved.

That is, in the present embodiment, the second assembled groove portion 3h is formed in the-circumferential direction of the rectilinear barrel 3 but may be formed in any directions if the second assembled groove pin 3h can be connected to the opening portion 31 and the first rectilinear groove portion 3g.

In addition, in the present embodiment, the first assembled groove portion 3i is formed along the optical axis direction but may be formed in any directions if the first assembled groove portion 3i can be connected to the opening portion 31 and the second assembled groove portion 3h.

Furthermore, the first assembled groove portion 3i and the second assembled groove portion 3h may be made by one groove portion, and by this groove portion, the opening portion 31 and the first rectilinear groove portion 3g may be connected.

In this way, in the present embodiment, the phase of the opening portion 31 and the phase of the first rectilinear groove portion 3g are varied by bending the assembled groove portions 3i, 3h. Consequently, because the relative position (relative position in the circumferential direction of the rectilinear barrel 3) between the opening portion 31 and the first rectilinear groove portion 3g can be varied by forming the assembled groove portions 3i, 3h into various shapes, the degree of design freedom can be improved.

When the length B of the flange portion 3e is short as is the case of the conventional example (in this case, there is no need to provide the first outside diameter concave portions 3j, 3k), the strength of the lens barrel 61 must be secured, and the protruded portion 3a and the opening portion 31 must be arranged at the position of the same phase.

However, because even in such case, the relative position (relative position in the circumferential direction of the rectilinear barrel 3) between the opening portion 31 (protruded portion 3a) and the first rectilinear groove portion 3g can be varied by forming the assembled groove portions 3i, 3h into various shapes, the degree of design freedom can be improved as compared with the conventional example.

As described above, because according to the present invention, in the second lens barrel member, the first groove portion and the opening portion are formed at different positions in the circumferential direction and on the circumferential wall, the second groove portion is formed for assembling the guide portion of the first lens barrel member into the first groove portion from the position of the opening portion, the phase of the opening portion and the phase of the first groove portion can be easily varied by changing the shape of the second groove portion, and the degree of design freedom of lens apparatus can be improved.

In addition, because by forming a protruded portion, which is formed on the outer circumference of the flange portion and engages with the fourth lens barrel member, in the position different from the opening portion in the circumferential direction, there is no need of arranging the protruded portion at the position of the phase same as that of the opening portion as is the case of the conventional example, the degree of design freedom of lens apparatus can be improved.

While preferred embodiments have been described, it is to be understood that modification and variation of the present invention may be made without departing from scope of the following claims.

What is claimed is:

1. A lens apparatus comprising:

a first barrel member which has a guide portion guided in an optical axis direction and a cam follower portion disposed on the guide portion;

a second barrel member having a circumferetial wall, a first groove portion for guiding the guide portion in the optical axis direction is formed on the circumferetial wall and a flange portion is formed at the end of the optical axis direction of the circumferential wall;

a third barrel member having a cam portion, the cam section engages with the cam follower portion to drive the first barrel member in the optical axis direction; and a driving mechanism for rotatably driving the third barrel member around the optical axis, wherein a concave portion which is receded with respect to the driving mechanism is formed on the outer circumference of the flange portion, and an opening portion is formed on the inner circumference of the flange portion to allow the cam follower portion to pass when the guide portion is engaged with the first groove portion, and in the second barrel member, the first groove portion and the opening portion are formed at different positions in the circumferential direction, and a second groove portion is formed on the circumferential wall to assemble the guide portion into the first groove portion from the position of the opening portion.

2. The lens apparatus according to claim 1, wherein the second groove portion has a portion which at least extends in the circumferential direction of the circumferential wall.

3. The lens apparatus according to claim 1, further comprising a fourth barrel member, wherein a protruded portion which engages with the fourth barrel member is formed on the outer circumference of the flange portion, and the protruded portion is formed at the position different from the opening portion in the circumferential direction.

4. An image-taking apparatus comprising:

a lens apparatus according to claim 1; and a photoelectric conversion element which photoelectrically converts an object formed by the lens apparatus.

5. A lens apparatus comprising:

a first barrel member which has a guide portion guided in an optical axis;

a second barrel member having a circumferetial wall, a first groove portion for guiding the guide portion in the optical axis direction is formed on the circumferetial wall and a flange portion is formed at the end of the optical axis direction of the circumferential wall;

wherein, an opening portion is formed on the flange portion in the second barrel member, the first groove portion and the opening portion are formed at different positions in the circumferential direction, and a second groove portion for connecting the first groove portion and the opening portion formed on the circumference wall.

* * * * *

UNITED STATES PATENT AND TRADEMARK OFFICE
CERTIFICATE OF CORRECTION

PATENT NO. : 6,822,810 B2
DATED : November 23, 2004
INVENTOR(S) : Kazushige Ichino It is certified that error appears in the above-identified patent and that said Letters Patent is hereby corrected as shown below:

Column 4,
Lines 24, 26, 30, 36, 47 and 59, delete "31" and insert -- 31 --.

Column 5,
Lines 18 and 26, delete "31" and insert -- 31 --.

Column 6,
Lines 8, 14, 21, 29, 34, 44 and 48, delete "31" and insert -- 31 --.

Signed and Sealed this

Fourth Day of April, 2006

JON W. DUDAS
*Director of the United States Patent and Trademark Office*